US010594848B2

(12) United States Patent
Narayanaswamy et al.

(10) Patent No.: US 10,594,848 B2
(45) Date of Patent: Mar. 17, 2020

(54) SYSTEMS AND METHODS OF INITIATING A COMMUNICATION AT A MOBILE DEVICE

(71) Applicant: QUALCOMM Incorporated, San Diego, CA (US)

(72) Inventors: Ashokkumar Narayanaswamy, Hyderabad (IN); Amandeep Singh Bedi, Hyderabad (IN); Shankar Anand, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/921,398

(22) Filed: Mar. 14, 2018

(65) Prior Publication Data
US 2019/0289110 A1 Sep. 19, 2019

(51) Int. Cl.
*H04M 1/2745* (2006.01)
*H04M 1/27* (2006.01)
*G06K 9/00* (2006.01)
*H04M 1/67* (2006.01)
(Continued)

(52) U.S. Cl.
CPC .... *H04M 1/27455* (2013.01); *G06K 9/00013* (2013.01); *G06K 9/00087* (2013.01); *H04M 1/27* (2013.01); *H04M 1/2745* (2013.01); *H04M 1/274525* (2013.01); *H04M 1/67* (2013.01); *H04M 1/7258* (2013.01); *G06F 3/04842* (2013.01); *H04M 2001/274541* (2013.01); *H04M 2250/12* (2013.01); *H04M 2250/22* (2013.01)

(58) Field of Classification Search
CPC . H04M 1/26–274583; H04M 2250/22; H04M 3/0482; H04M 2250/0485; H04M 2001/274541; G06K 9/00013; G06K 9/00087; G06F 3/04842–0485
See application file for complete search history.

(56) References Cited

U.S. PATENT DOCUMENTS 5,889,509 A * 3/1999 Sudo ................. H04M 1/72544
345/168
2002/0142807 A1 10/2002 Cho
(Continued)

FOREIGN PATENT DOCUMENTS

JP 2004328144 A * 11/2004
WO 2018038545 A1 3/2018

OTHER PUBLICATIONS

International Search Report and Written Opinion—PCT/US2019/021399—ISA/EPO —dated May 24, 2019.

*Primary Examiner* — Gennadiy Tsvey
(74) *Attorney, Agent, or Firm* — Moore Intellectual Property Law, PLLC (57) ABSTRACT

A method of initiating a communication includes detecting, at a mobile device, that a button is being pressed. The method also includes generating sensor information associated with a finger in response to a determination that the finger is pressing the button. The sensor information indicates at least a duration that the finger is pressing the button. The method further includes initiating the communication with a particular contact of a plurality of contacts using contact information for the particular contact. The particular contact is selected based on at least the duration.

20 Claims, 6 Drawing Sheets

(51) Int. Cl.
*H04M 1/725* (2006.01)
*G06F 3/0484* (2013.01)

(56) References Cited

U.S. PATENT DOCUMENTS

| | | | | |
|---|---|---|---|---|
| 2002/0144886 | A1* | 10/2002 | Engelmann | H03K 17/96 |
| | | | | 200/600 |
| 2006/0285659 | A1* | 12/2006 | Suryanarayana | H04M 1/247 |
| | | | | 379/88.02 |
| 2008/0107253 | A1* | 5/2008 | Gupta | H04M 1/274558 |
| | | | | 379/216.01 |
| 2009/0111435 | A1* | 4/2009 | Tsuei | H04M 1/2745 |
| | | | | 455/414.1 |
| 2009/0124239 | A1* | 5/2009 | Tsuei | H04M 1/2745 |
| | | | | 455/414.1 |
| 2009/0124293 | A1* | 5/2009 | Tsuei | G06F 3/04886 |
| | | | | 455/566 |
| 2013/0318625 | A1* | 11/2013 | Fan | H04L 9/3231 |
| | | | | 726/27 |
| 2015/0042572 | A1* | 2/2015 | Lombardi | G09G 3/3208 |
| | | | | 345/173 |
| 2015/0065202 | A1* | 3/2015 | Lee | H04M 1/185 |
| | | | | 455/566 |
| 2015/0089666 | A1* | 3/2015 | Lee | G06F 21/53 |
| | | | | 726/27 |
| 2016/0360401 | A1 | 12/2016 | Guo et al. | |
| 2017/0195636 | A1* | 7/2017 | Child | H04N 7/183 |

* cited by examiner

SYSTEMS AND METHODS OF INITIATING A COMMUNICATION AT A MOBILE DEVICE

I. FIELD

The present disclosure is generally related to a mobile device.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These mobile devices can communicate voice and data packets over wireless networks. Further, many such devices incorporate additional functionality such as a digital still camera, a digital video camera, a digital recorder, and an audio file player. Also, such mobile devices can process executable instructions, including software applications, such as a web browser application, that can be used to access the Internet. As such, these mobile devices can include significant computing capabilities.

A user of a particular mobile device may perform different actions to establish a communication with a particular contact (e.g., a particular person, a particular business, etc.). As a non-limiting example, the user may dial a phone number associated with the particular contact to establish the communication. However, if the user does not know the phone number, the user will not be able to establish the communication. As another non-limiting example, the user may search through a list of contact entries (e.g., contact information) to find a particular contact entry associated with the particular contact. Upon finding the particular contact entry, the user may press a "Talk" button to establish the communication with the particular contact. However, this may be a time-consuming process that is unfavorable to the user, such as in the case of an emergency.

III. SUMMARY

According to a particular implementation of the techniques disclosed herein, a mobile device includes a button and a sensor configured to detect that the button is being pressed. The sensor is also configured to generate sensor information associated with a finger in response to a determination that the finger is pressing the button. The sensor information indicates at least a duration that the finger is pressing the button. The mobile device also includes a contact database that stores contact information for each contact of a plurality of contacts. The mobile device further includes a processor configured to initiate a communication with a particular contact of the plurality of contacts using contact information for the particular contact. The particular contact is selected based on at least the duration.

According to another particular implementation of the techniques disclosed herein, a method of initiating a communication includes detecting, at a mobile device, that a button is being pressed. The method also includes generating sensor information associated with a finger in response to a determination that the finger is pressing the button. The sensor information indicates at least a duration that the finger is pressing the button. The method further includes initiating the communication with a particular contact of a plurality of contacts using contact information for the particular contact. The particular contact is selected based on at least the duration.

According to another particular implementation of the techniques disclosed herein, a non-transitory computer-readable medium includes instructions that, when executed by a processor within a mobile device, cause the processor to perform operations including detecting that a button is being pressed. The operations also include generating sensor information associated with a finger in response to a determination that the finger is pressing the button. The sensor information indicates at least a duration that the finger is pressing the button. The operations further include initiating a communication with a particular contact of a plurality of contacts using contact information for the particular contact. The particular contact is selected based on at least the duration.

According to another particular implementation of the techniques disclosed herein, a mobile device includes means for detecting that a button is being pressed. The mobile device also includes means for generating sensor information associated with a finger in response to a determination that the finger is pressing the button. The sensor information indicates at least a duration that the finger is pressing the button. The mobile device also includes means for initiating a communication with a particular contact of a plurality of contacts using contact information for the particular contact. The particular contact is selected based on at least the duration.

One advantage of the above-described implementations is that a mobile device can establish a communication with a particular contact without verbal cues from a user and without requiring the user to memorize contact information (e.g., a phone number) associated with the particular contact. For example, the user can press and hold a button on the mobile device for a particular duration to establish communication with the particular contact. Other implementations, advantages, and features of the present disclosure will become apparent after review of the entire application, including the following sections: Brief Description of the Drawings, Detailed Description, and the Claims.

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first, " "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "detecting", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

Figure 1:
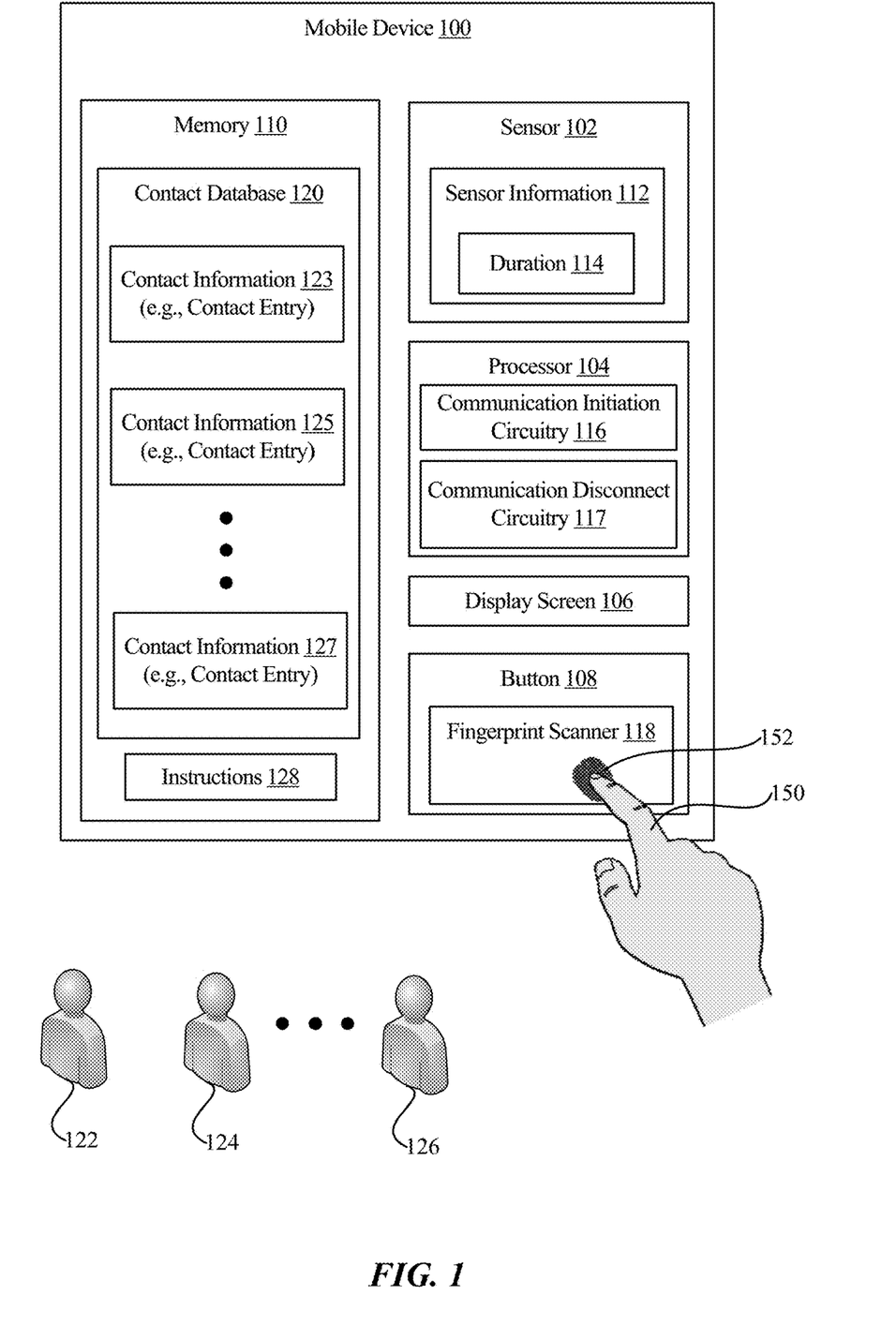
FIG. 1 is a diagram of a mobile device that is operable to initiate a communication with a particular contact.

Referring to FIG. 1, a diagram of a mobile device 100 that is operable to initiate a communication with a particular contact is shown. The mobile device 100 may be a smart phone, a mobile phone, a personal digital assistant (PDA), a laptop, a handheld device, a tablet, an augmented reality device, a virtual reality device, a mixed reality device, or any other device. The mobile device 100 includes a sensor 102, a processor 104, a display screen 106, a button 108, and a memory 110. One or more components of the mobile device 100 may be integrated into a single component. As a non-limiting example, if the mobile device 100 is a "touchscreen" device, the button 108 may be integrated into the display screen 106. According to some implementations, the mobile device 100 includes additional components that are not shown. As non-limiting examples, the mobile device 100 may also include a keypad, a speaker, a microphone, etc.

The memory 110 includes a contact database 120 and instructions 128. The instructions 128 are executable by the processor 104 to perform the operations described herein. According to one implementation, the memory 110 is a non-transitory computer-readable medium that includes instructions 128 that are executable by the processor 104. The contact database 120 stores contact information (e.g., contact entries) for a plurality of contacts 122, 124, 126. To illustrate, the contact database 120 stores contact information 123 for a contact 122, contact information 125 for a contact 124, and contact information 127 for a contact 126. The contact information 123, 125, 127 is described in further detail with respect to FIG. 2.

Each contact 122, 124, 126 may correspond to a person or a business. The contact information 123, 125, 127 includes information that is used by the mobile device 100 to initiate a communication (e.g., a phone call, a video call, etc.) with the corresponding contact 122, 124, 126. A user of the mobile device 100 may store the contact information 123, 125, 127 at the mobile device 100. Although contact information 123, 125, 127 for three contacts 122, 124, 126 is shown, in other implementations, contact information for fewer than three contacts or for additional contacts is included in the contact database 120. As a non-limiting example, contact information for one-hundred fifty contacts may be included in the contact database 120.

The sensor 102 is configured to detect that a finger 150 is pressing the button 108. As described in greater detail below, the finger 150 of a user may press and hold the button 108 for different durations to initiate communications with different contacts 122, 124, 126 using the contact information 123, 125, 127, respectively, in the contact database 120. According to one implementation, initiating a communication with a contact includes initiating an audio call with the contact. According to another implementation, initiating a communication with a contact includes initiating a video call with the contact. The sensor 102 is configured to generate sensor information 112 associated with a finger pressing the button 108 in response to a determination that the button 108 is being pressed, such as by the finger 150. The sensor information 112 indicates a duration 114 that the finger 150 is pressing the button 108. As a non-limiting example, the sensor information 112 may indicate that the finger 150 has been pressing the button 108 for a duration 114 of two seconds. As another non-limiting example, the sensor information 112 may indicate that the finger 150 has been pressing the button 108 for a duration 114 of eight seconds. Because the duration 114 is a dynamic parameter, the sensor information 112 is continuously updated and provided to the processor 104 to indicate how long (e.g., the duration 114) the finger 150 has been pressing the button 108.

A fingerprint scanner 118 is integrated into the button 108. The fingerprint scanner 118 is configured to scan a fingerprint 152 of the finger 150 in response to a determination that the finger 150 is pressing the button 108. The scanned fingerprint 152 is also provided to the processor 104 along with the sensor information 112.

The processor 104 includes communication initiation circuitry 116 and communication disconnect circuitry 117. The communication initiation circuitry 116 is configured to initiate a communication with a particular contact of the plurality of contacts 122, 124, 126. As described below, the particular contact is selected based on at least the duration 114. According to some implementations, the particular contact is also selected based on the fingerprint 152. For example, the processor 104 uses the contact information 123, 125, 127 in conjunction with the duration 114 and the scanned fingerprint 152 to select a contact 122, 124, 126 for connection.

Figure 2:
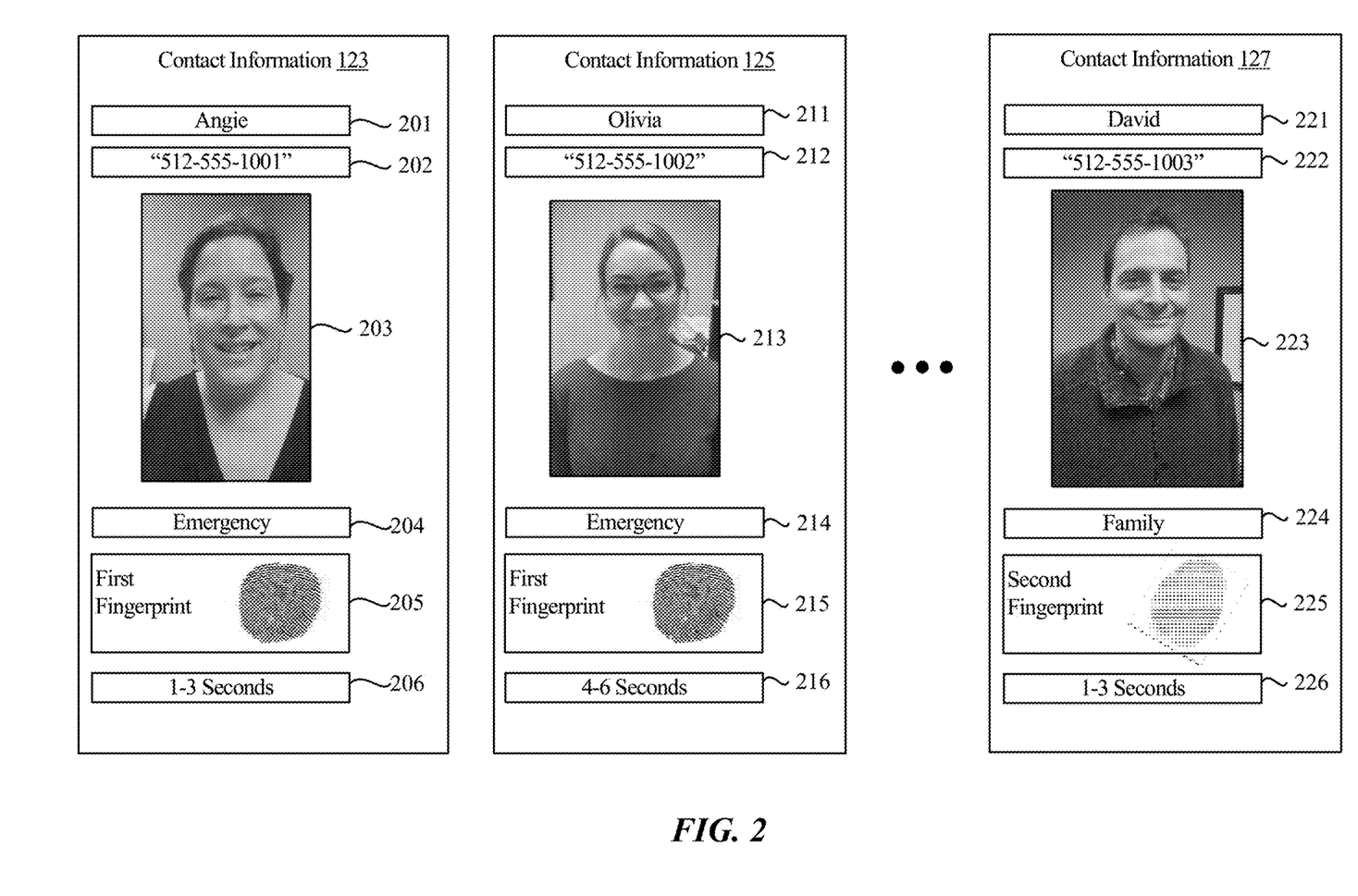
FIG. 2 illustrates contact information for different contacts stored at the mobile device.

To illustrate, referring to FIG. 2, contact information stored at the mobile device 100 is shown. For example, FIG. 2 illustrates the contact information 123 for the contact 122, the contact information 125 for the contact 124, and the contact information 127 for the contact 126.

The contact information 123 includes a name 201 of the contact 122, a phone number 202 of the contact 122, a picture 203 of the contact 122, and a group designation 204 of the contact 122. According to FIG. 2, the name 201 of the contact 122 is "Angie", the phone number 202 of the contact 122 is "512-555-1001", and the group designation 204 indicates that the contact 122 is an "emergency" contact. The contact information 125 includes a name 211 of the contact 124, a phone number 212 of the contact 124, a picture 213 of the contact 124, and a group designation 214 of the contact 124. According to FIG. 2, the name 211 of the contact 124 is "Olivia", the phone number 212 of the contact 124 is "512-555-1002", and the group designation 214 indicates that the contact 124 is an "emergency" contact. The contact information 127 includes a name 221 of the contact 126, a phone number 222 of the contact 126, a picture 223 of the contact 126, and a group designation 224 of the contact 126. According to FIG. 2, the name 221 of the contact 126 is "David", the phone number 222 of the contact 126 is "512-555-1003", and the group designation 224 indicates that the contact 126 is a "family" contact.

The contact information 123, 125, 127 also includes fingerprint association information. To illustrate, the contact information 123 includes fingerprint association information 205 indicating that the contact 122 is associated with a first fingerprint, the contact information 125 includes fingerprint association information 215 indicating that the contact 124 is associated with the first fingerprint, and the contact information 127 includes fingerprint association information 225 indicating that the contact 126 is associated with a second fingerprint. As used herein, if a contact is "associated with a particular fingerprint", a communication can be initiated with the contact in response to a determination that a finger having the particular fingerprint is pressing the button 108. As described below, initiation of the communication is also dependent on the duration that the finger 150 is pressing the button 108.

The contact information 123, 125, 127 also includes duration information that associates an amount of time the button 108 is pressed to the respective contact 122, 124, 126. To illustrate, the contact information 123 includes duration information 206 that indicates if a finger having the first fingerprint (as indicated by the fingerprint association information 205) is pressing the button 108 for one second to three seconds, the communication initiation circuitry 116 is to initiate a communication with the contact 122 (e.g., "Angie"). The contact information 125 includes duration information 216 that indicates if a finger having the first fingerprint (as indicated by the fingerprint association information 215) is pressing the button 108 for four seconds to six seconds, the communication initiation circuitry 116 is to initiate a communication with the contact 124 (e.g., "Olivia"). The contact information 127 includes duration information 226 that indicates if a finger having the second fingerprint (as indicated by the fingerprint association information 225) is pressing the button 108 for one second to three seconds, the communication initiation circuitry 116 is to initiate a communication with the contact 126 (e.g., "David"). The duration information 206, 216, 226 can be set by a user of the mobile device 100.

Referring back to FIG. 1, in some implementations, the processor 104 is configured to determine whether the fingerprint 152 is associated with the first fingerprint or the second fingerprint. The first fingerprint is associated with a first group of contacts 122, 124, and the second fingerprint is associated with a second group of contacts (e.g., a group including the contact 126). The first group of contacts 122, 124 may have similar group designations 204, 214, and the second group of contacts may have similar group designations. For example, in the illustrated example, the group designations 204, 214 indicate that the first group of contacts 122, 124 is "emergency" contacts, and the group designation 225 indicates that the second group of contacts is "family" contacts. It should be understood that the illustrated example is solely for illustrative purposes and should not be construed as limiting. For example, the first group of contacts 122, 124 may include one of emergency contacts of the user, family contacts of the user, friend contacts of the user, work contacts of the user, etc. The second group of contacts may include a category of contacts that is different from the first group of contacts 122, 124.

If the processor 104 determines that the fingerprint 152 is associated with the first fingerprint, the particular contact is selected from the first group of contacts 122, 124. If the processor 104 determines that the fingerprint 152 is associated with the second fingerprint, the particular contact is selected from the second group of contacts (e.g., a group of contacts that includes the contact 126). For ease of illustration, the following description assumes that the processor 104 determines that the fingerprint 152 is associated with the first fingerprint and the particular contact is selected from the first group of contacts 122, 124.

The contact 122 (e.g., "Angie") is selected as the particular contact (to initiate communication with) if the duration 114 is associated with a first time span, and the contact 124 (e.g., "Olivia") is selected as the particular contact if the duration 114 is associated with a second time span. According to the illustrated example, the first time span ranges from one second to three seconds, and the second time span ranges from four seconds to six seconds.

Figure 3A:
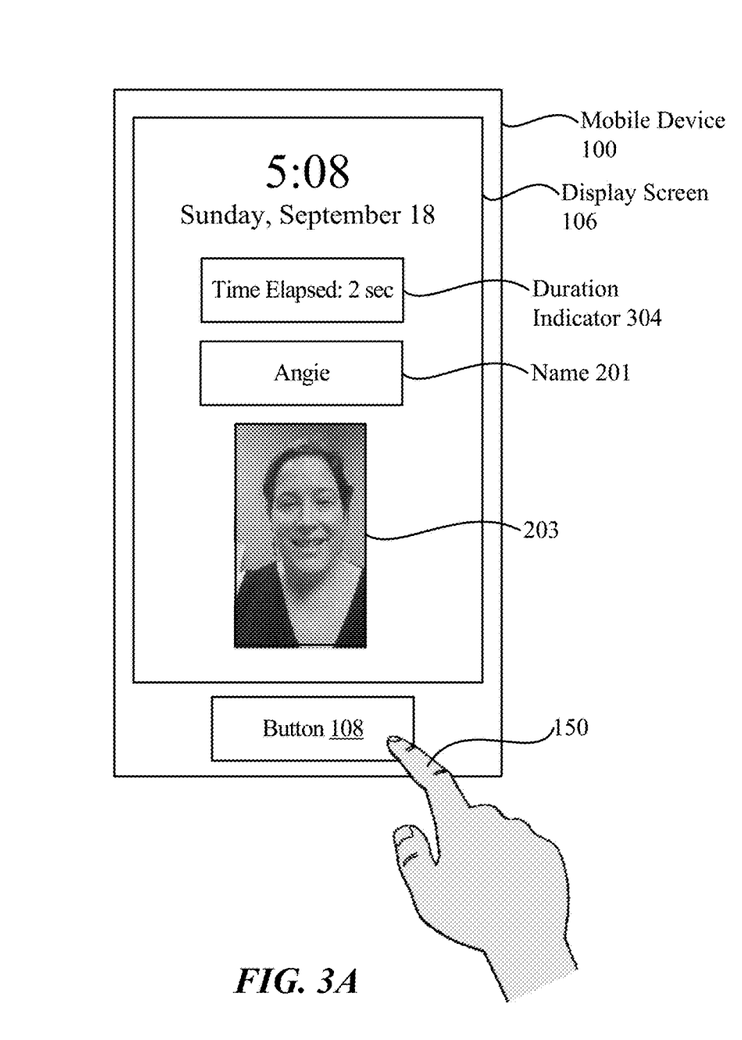
FIG. 3A illustrates a display screen of the mobile device while a finger is pressing a button for a first duration of time.

In some implementations, once the button 108 is pressed, a duration indicator and a picture of the contact to be dialed is displayed on the display screen 106. For example, referring to FIG. 3A, an illustration of the display screen 106 when the button 108 has been pressed for two seconds is shown. The processor 104 is configured to generate a duration indicator 304 in response to a determination that the button 108 is pressed. The duration indicator 304 indicates the duration 114 that the finger 150 has been pressing the button 108. The processor 104 is also configured to display the duration indicator 304 on the display screen 106. For example, referring to FIG. 3A, the duration indicator 304 indicates that two seconds has elapsed (e.g., the finger 150 has been pressing the button 108 for two seconds). The processor 104 is also configured to display the picture 203 associated with the contact 122 and the name of the contact 122 (e.g., "Angie") on the display screen 106 while the duration 114 is associated with the first time span. If the finger 150 releases the button 108 during the first time span, the communication initiation circuitry 116 initiates a communication with the contact 122. For example, the communication initiation circuitry 116 dials the phone number 202.

Figure 3B:
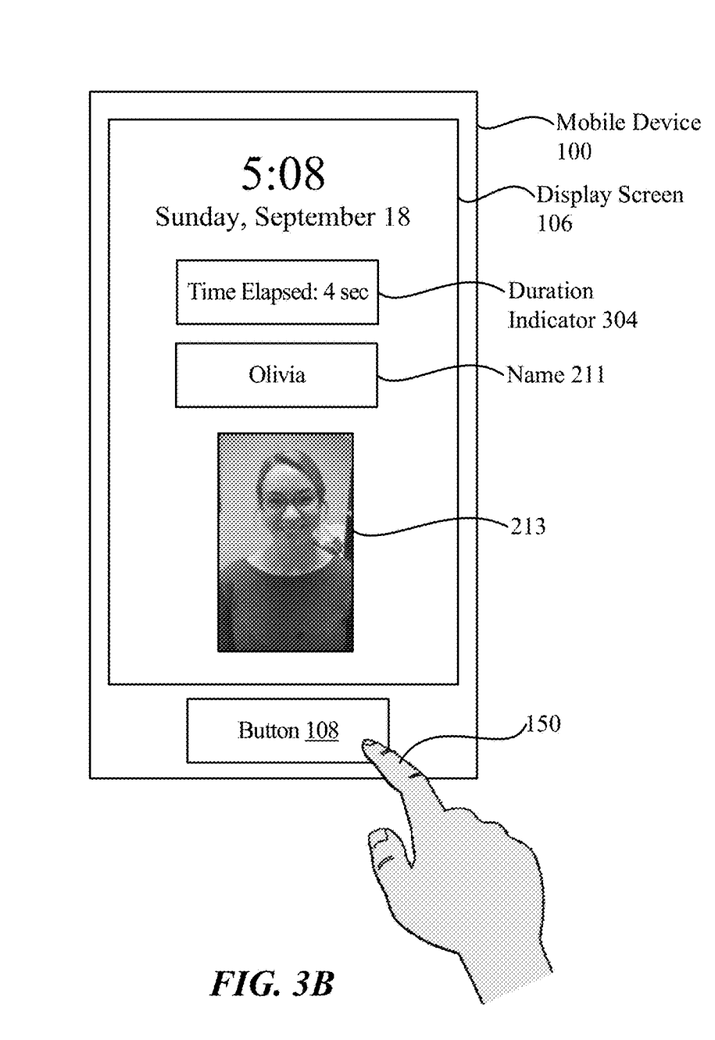
FIG. 3B illustrates the display screen of the mobile device while the finger is pressing the button for a second duration of time that is longer than the first duration of time.

If the finger 150 presses the button for a duration 114 longer than the first time span (e.g., presses the button for four seconds), the display on the display screen 106 changes to reflect information associated with the contact 124. For example, referring to FIG. 3B, the processor 104 is configured to display the picture 213 associated with the contact 124 and the name of the contact 124 (e.g., "Olivia) on the display screen while the duration 114 is associated with the second time span. If the finger 150 releases the button 108 during the second time span, the communication initiation circuitry 116 initiates a communication with the contact 124. For example, the communication initiation circuitry 116 dials the phone number 212.

In some implementations, the mobile device 100 is configured to disconnect the communication in response to a determination that the finger 150 tapped the button 108 a particular number of times. According to one implementation, the particular number of times is two times. To illustrate, the sensor 102 is configured to detect that the finger 150 tapped the button 108 the particular number of times. The communication disconnect circuitry 117 disconnects the communication in response to receiving an indication from the sensor 102 that the finger 150 tapped the button 108 the particular number of times.

The techniques described with respect to FIGS. 1-3B enable a user to initiate a communication (e.g., an audio call or a video call) by pressing and holding the button 108. For example, the user can set different time spans for the duration information 206, 216 of respective contacts 122, 124. If the user presses the button 108 for the time span associated with the duration information 206, the mobile device 100 initiates the communication with the contact 122. If the user presses the button 108 for the time span associated with the duration information 216, the mobile device 100 initiates the communication with the contact 124. As a result, the mobile device 100 can establish a communication with a particular contact without verbal cues from the user and without requiring the user to memorize contact information (e.g., the phone number) associated with the particular contact.

Although FIGS. 1-3B illustrate implementations in which the mobile device 100 performs operations to initiate a communication with a particular contact, in other implementations, some of the operations performed by the mobile device 100 are optional. For example, in some implementations, the mobile device 100 does not display a picture of the contact to be dialed, a duration indicator indicating the duration that the button 108 is pressed, etc. Additionally in some implementations, the mobile device 100 does not disconnect the communication in response to detecting that the button 108 has been tapped multiple times.

Figure 4A:
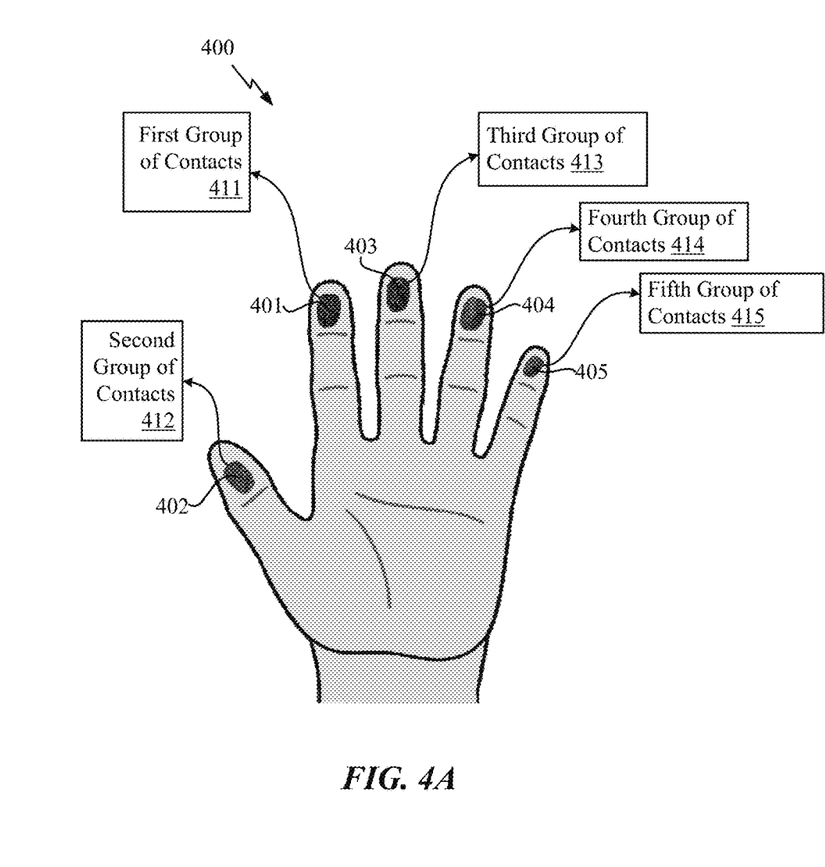
FIG. 4A illustrates a hand of a user associated with the mobile device.

Referring to FIG. 4A, a hand 400 of a user that operates the mobile device 100 is shown. An index finger of the hand 400 has a first fingerprint 401, a thumb of the hand 400 has a second fingerprint 402, a middle finger of the hand 400 has a third fingerprint 403, a ring finger of the hand 400 has a fourth fingerprint 404, and a pinky of the hand 400 has a fifth fingerprint 405.

According to one implementation, the first fingerprint 401 corresponds to the first fingerprint described with respect to FIG. 2, and the second fingerprint 402 corresponds to the second fingerprint described with respect to FIG. 2. For example, the first fingerprint 401 corresponds to a fingerprint of a first finger of a user, and the second fingerprint corresponds to a second fingerprint of a second finger of the same user.

Each fingerprint 401-405 is associated with a different group of contacts. For example, the first fingerprint 401 is associated with a first group of contacts 411 (e.g., the "emergency" contacts as described with respect to FIG. 2), and the second fingerprint 402 is associated with a second group of contacts 412 (e.g., the "family" contacts as described with respect to FIG. 2). The third fingerprint 403 is associated with a third group of contacts 413, the fourth fingerprint 404 is associated with a fourth group of contacts 414, and the fifth fingerprint 405 is associated with a fifth group of contacts 415. Thus, the contact that is dialed by holding the button 108 is based not only on the duration 114 that a finger holds the button 108, but is also based on the finger that is pressing the button 108. As a result, the user may "speed dial" five times as many contacts by holding the button 108 by assigning different groups to different fingers, as illustrated in FIG. 4A.

According to another implementation, each fingerprint 401-405 is assigned to a different contact of the plurality of contacts 122, 124, 126. To illustrate, the first fingerprint 401 may be assigned to the contact 122, the second fingerprint 402 may be assigned to the contact 124, the third fingerprint 403 may be assigned to the contact 126, etc. If the index finger having the first fingerprint 401 holds the button 108, the processor 104 may initiate a communication with the contact 122 using the phone number 202. If the thumb having the second fingerprint 402 holds the button 108, the processor 104 may initiate a communication with the contact 124 using the phone number 212. If the middle finger having the third fingerprint 404 holds the button 108, the processor 104 may initiate a communication with the contact 126 using the phone number 222. In this scenario, the communication can be initiated regardless of the duration 114 that the button 108 is pressed. Thus, the communication with the contact 122, 124, 126 may be initiated solely based on the fingerprint pressing the button 108.

Figure 4B:
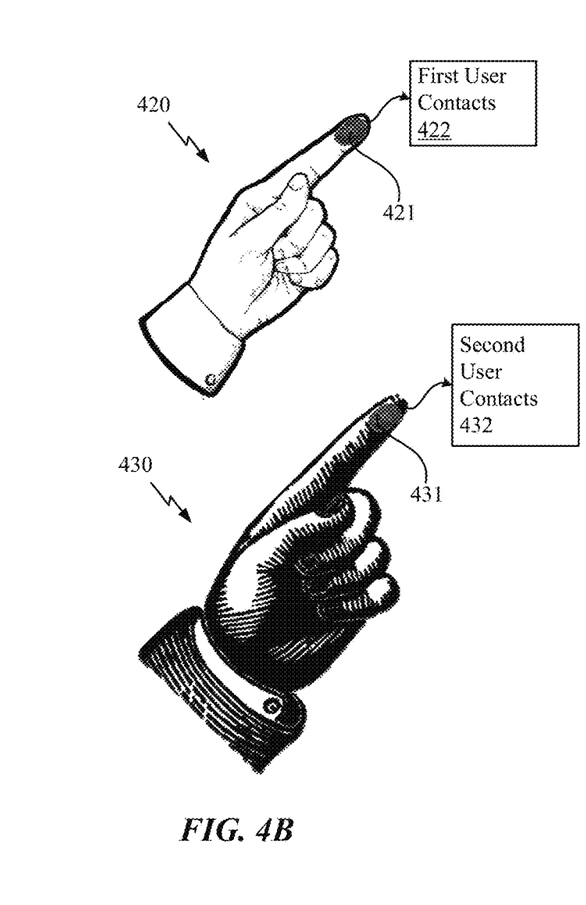
FIG. 4B illustrates a hand of a first user associated with the mobile device and a hand of a second user associated with the mobile device.

Referring to FIG. 4B, a hand 420 of a first user that operates the mobile device 100 and a hand 430 of a second user that operates the mobile device 100 is shown. An index finger of the hand 420 has a first fingerprint 421, and an index finger of the hand 430 has a second fingerprint 431.

According to one implementation, the first fingerprint 421 corresponds to the first fingerprint described with respect to FIG. 2, and the second fingerprint 431 corresponds to the second fingerprint described with respect to FIG. 2. The first fingerprint 421 is associated with first user contacts 422 (e.g., the contacts 122, 124), and the second fingerprint 431 is associated with second user contacts 432 (e.g., the contact 126). Thus, the contact that is dialed by holding the button 108 is based not only on the duration 114 that a finger holds the button 108, but is also based on the user that is pressing the button 108. To illustrate if the first user presses the button 108 for two seconds, the contact 122 (e.g., "Angie") is dialed. However, if the second user presses the button 108 for two seconds, the contact 126 (e.g., "David") is dialed. As a result, different users may use the same mobile device 100 to "speed dial" different contacts by holding the button 108.

Figure 5:
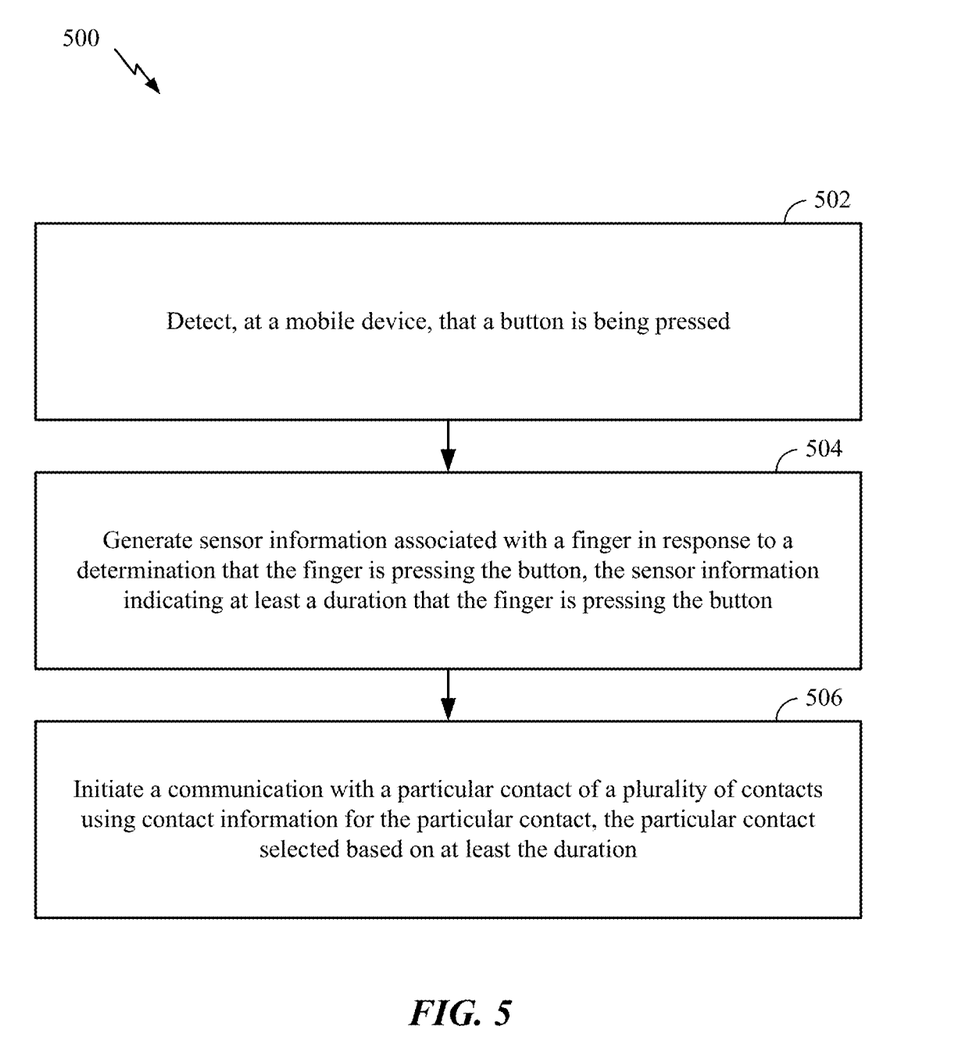
FIG. 5 illustrates a flowchart of a method for initiating a communication at the mobile device.

Referring to FIG. 5, a method 500 of initiating a communication at a mobile device is shown. The method 500 may be performed by the mobile device 100 of FIG. 1.

The method 500 includes detecting, at a mobile device, that a button is being pressed, at 502. For example, referring to FIG. 1, the sensor 102 detects that the button 108 is being pressed by the finger 150.

The method 500 also includes generating sensor information associated with a finger in response to a determination that the finger is pressing the button, at 504. The sensor information indicates at least a duration that the finger is pressing the button. For example, referring to FIG. 1, the sensor 102 generates the sensor information 112 associated with the finger 150 in response to a determination that the finger 150 is pressing the button 108. The sensor information 112 indicates the duration 114 that the finger 150 is pressing the button 108. According to some implementations, the sensor information 112 is generated, in part, by the fingerprint scanner 118. In this implementation, the sensor information 112 also includes the scanned fingerprint 152.

The method 500 also includes initiating a communication with a particular contact of a plurality of contacts using contact information for the particular contact, at 506. The particular contact is selected based on at least the duration.

For example, referring to FIG. 1, the communication initiating circuitry 116 initiates the communication with a particular contact of the plurality of contacts 122, 124, 126 using contact information for the particular contact. The particular contact is selected based on the duration 114 and the scanned fingerprint 152. The communication includes an audio call or a video call.

According to one implementation of the method 500, a first contact (e.g., the contact 122) of the plurality of contacts is selected as the particular contact if the duration is associated with a first time span (e.g., one second to three seconds), and a second contact (e.g., the contact 124) of the plurality of contacts is selected as the particular contact if the duration is associated with a second time span (e.g., four seconds to six seconds) that is longer than the first time span. The method 500 may also include displaying a duration indicator (e.g., the duration indicator 304) on a display screen (e.g., the display screen 106) of the mobile device. The duration indicator indicates the duration that the finger is pressing the button. The method may further include displaying a first picture (e.g., the picture 203) associated with the first contact on the display screen while the duration is associated with the first time span and displaying a second picture (e.g., the picture 213) associated with the second contact on the display screen while the duration is associated with the second time span.

According to one implementation, the method 500 also includes scanning a fingerprint of the finger in response to a determination that the finger is pressing the button. The method 500 may also include determining whether the fingerprint is associated with a first fingerprint or a second fingerprint. The first fingerprint is associated with a first group of contacts of the plurality of contacts, and the second fingerprint is associated with a second group of contacts of the plurality of contacts. The particular contact is selected from the first group of contacts if the fingerprint is associated with the first fingerprint, and the particular contact is selected from the second group of contacts if the fingerprint is associated with the second fingerprint. According to one implementation of the method 500, the first fingerprint corresponds to a fingerprint of a first finger of a user, and the second fingerprint corresponds to a fingerprint of a second finger of the user. According to another implementation, the first fingerprint corresponds to a fingerprint of a first user, and the second fingerprint corresponds to a fingerprint of a second user.

According to one implementation, the method 500 includes detecting that the finger tapped the button a particular number of times. The method 500 also includes disconnecting the communication in response to a determination that the finger tapped the button the particular number of times. According to one implementation, the particular number of times is two times.

The method 500 enables a user to initiate a communication (e.g., an audio call or a video call) by pressing and holding the button 108. For example, the user can set different time spans for the duration information 206, 216 of respective contacts 122,124. If the user presses the button 108 for the time span associated with the duration information 206, the mobile device 100 initiates the communication with the contact 122. If the user presses the button 108 for the time span associated with the duration information 216, the mobile device 100 initiates the communication with the contact 124. As a result, the mobile device 100 can establish a communication with a particular contact without verbal cues from the user and without requiring the user to memorize contact information (e.g., the phone number) associated with the particular contact.

Figure 6:
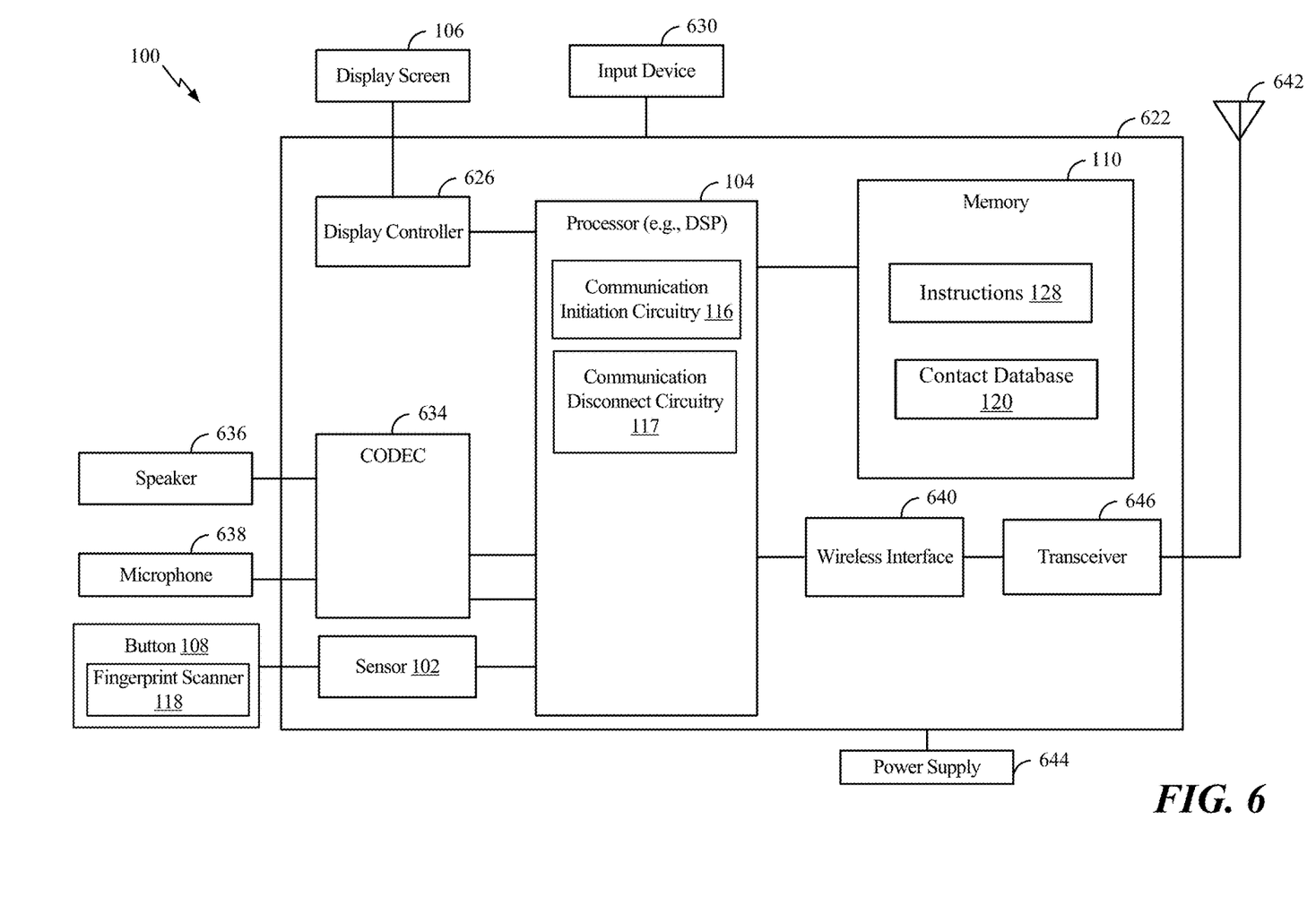
FIG. 6 is a block diagram of a particular illustrative example of the mobile device that is operable to perform the techniques described with reference to FIGS. 1-5.

Referring to FIG. 6, a block diagram of a particular illustrative implementation of the mobile device 100 (e.g., a wireless communication device) is shown. In various implementations, the mobile device 100 may have more components or fewer components than illustrated in FIG. 6. In a particular implementation, the mobile device 100 includes the processor 104, such as a central processing unit (CPU) or a digital signal processor (DSP), coupled to the memory 110. The processor 104 includes the communication initiation circuitry 116 and the communication disconnect circuitry 117.

The memory 110 includes the instructions 128 (e.g., executable instructions) such as computer-readable instructions or processor-readable instructions. The instructions 128 may include one or more instructions that are executable by a computer, such as the processor 104. The memory 110 also includes the contact database 120.

FIG. 6 also illustrates a display controller 626 that is coupled to the processor 104 and to the display screen 106. A coder/decoder (CODEC) 634 may also be coupled to the processor 104. A speaker 636 and a microphone 638 are coupled to the CODEC 634. FIG. 6 also illustrates that the sensor 102 is coupled to the processor 104, and the button 108 is coupled to the sensor 102. The fingerprint scanner 118 is integrated into the button 108. According to one implementation, the button 108 (and the fingerprint scanner 118) is integrated into the display screen 106. FIG. 6 further illustrates that a wireless interface 640, such as a wireless controller, and a transceiver 646 may be coupled to the processor 104 and to an antenna 642, such that wireless data received via the antenna 642, the transceiver 646, and the wireless interface 640 may be provided to the processor 104.

In some implementations, the processor 104, the display controller 626, the memory 110, the CODEC 634, the sensor 102, the wireless interface 640, and the transceiver 646 are included in a system-in-package or system-on-chip device 622. In some implementations, an input device 630 and a power supply 644 are coupled to the system-on-chip device 622. Moreover, in a particular implementation, as illustrated in FIG. 6, the display screen 106, the input device 630, the speaker 636, the microphone 638, the antenna 642, the button 108, and the power supply 644 are external to the system-on-chip device 622. In a particular implementation, each of the display screen 106, the input device 630, the button 108, the speaker 636, the microphone 638, the antenna 642, and the power supply 644 may be coupled to a component of the system-on-chip device 622, such as an interface or a controller.

The mobile device 100 may include a headset, a smart watch, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 110 may include or correspond to a non-transitory computer readable medium storing the instructions 128. The instructions 128 may include one or more instructions that are executable by a computer, such as the processor 104. The instructions 128 may cause the processor 104 to perform the method 500 of FIG. 5.

One or more components of the mobile device 100 may be implemented via dedicated hardware (e.g., circuitry), by a processor executing instructions to perform one or more tasks, or a combination thereof. As an example, the memory 110 or one or more components of the processor 104, and/or the CODEC 634 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 128) that, when executed by a computer (e.g., a processor in the CODEC 634 or the processor 104), may cause the computer to perform one or more operations described with reference to FIGS. 1-5.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, an apparatus includes means for detecting that a button associated with a mobile device is being pressed. For example, the means for detecting may include the sensor 102, the fingerprint scanner 118, one or more other devices, circuits, modules, sensors, or any combination thereof.

The apparatus also includes means for generating sensor information associated with a finger in response to a determination that the finger is pressing the button. The sensor information indicates at least a duration that the finger is pressing the button. For example, the means for generating may include the sensor 102, the fingerprint scanner 118, one or more other devices, circuits, modules, or any combination thereof.

The apparatus also includes means for initiating a communication with a particular contact of a plurality of contacts using contact information for the particular contact. The particular contact is selected based on at least the duration. For example, the means for initiating the communication may include the processor 104, the communication initiation circuitry 116, one or more other devices, circuits, modules, or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A mobile device comprising:
   a button;
   a sensor configured to:
   detect when the button is being pressed; and
   generate sensor information in response to a determination that the button is pressed, the sensor information indicating at least a duration that the button is pressed;
   a fingerprint scanner integrated into the button, the fingerprint scanner configured to scan a fingerprint of a finger in response to a determination that the button is being pressed by the finger;
   a contact database storing contact information for each contact of a plurality of contacts;
   a display screen; and
   a processor configured to:
   initiate a communication with a particular contact of the plurality of contacts using contact information for the particular contact, the particular contact selected based on at least the duration;
   display a duration indicator on the display screen, the duration indicator indicating the duration;
   display a first image associated with a first contact of the plurality of contacts on the display screen while the duration is associated with a first time span, wherein the first contact is selected if the duration is associated with the first time span;
   display a second image associated with a second contact of the plurality of contacts on the display screen while the duration is associated with a second time span that is longer than the first time span, wherein the second contact is selected if the duration is associated with the second time span;

determine whether the fingerprint is associated with a first fingerprint or a second fingerprint, the first fingerprint associated with a first group of contacts of the plurality of contacts, and the second fingerprint associated with a second group of contacts of the plurality of contacts, wherein the first contact is selected from the first group of contacts in response to the fingerprint being associated with the first fingerprint or from the second group of contacts in response to the fingerprint being associated with the second fingerprint; and determine that a disconnect option is enabled, wherein, in response to enablement of the disconnect option, the communication is disconnected in response to detection that the button has been tapped a particular number of times.

2. The mobile device of claim 1, wherein the communication includes an audio call or a video call.

3. The mobile device of claim 1, wherein the first fingerprint corresponds to a fingerprint of a first finger of a user, and wherein the second fingerprint corresponds to a fingerprint of a second finger of the user.

4. The mobile device of claim 3, wherein the first group of contacts includes one of emergency contacts of the user, family contacts of the user, friend contacts of the user, or work contacts of the user, and wherein the second group of contacts is different from the first group of contacts.

5. The mobile device of claim 1, wherein the first fingerprint corresponds to a fingerprint of a first user, and wherein the second fingerprint corresponds to a fingerprint of a second user.

6. The mobile device of claim 1, wherein the sensor is further configured to detect that the button is tapped the particular number of times, and wherein the processor is configured to disconnect the communication in response to a determination that the button is tapped the particular number of times.

7. The mobile device of claim 6, wherein the particular number of times is two times.

8. A method of initiating a communication, the method comprising:

detecting, at a mobile device, when a button is being pressed;

generating sensor information in response to a determination that the button is pressed, the sensor information indicating at least a duration that the button is pressed;

scanning a fingerprint of a finger in response to a determination that the finger is pressing the button;

initiating the communication with a particular contact of a plurality of contacts using contact information for the particular contact, the particular contact selected based on at least the duration;

displaying a duration indicator on a display screen, the duration indicator indicating the duration;

displaying a first image associated with a first contact of a plurality of contacts on the display screen while the duration is associated with a first time span, wherein the first contact is selected if the duration is associated with the first time span;

displaying a second image associated with a second contact of the plurality of contacts on the display screen while the duration is associated with a second time span that is longer than the first time span, wherein the second contact is selected if the duration is associated with the second time span;

determining whether the fingerprint is associated with a first fingerprint or a second fingerprint, the first fingerprint associated with a first group of contacts of the plurality of contacts, and the second fingerprint associated with a second group of contacts of the plurality of contacts, wherein the first contact is selected from the first group of contacts in response to the fingerprint being associated with the first fingerprint or from the second group of contacts in response to the fingerprint being associated with the second fingerprint; and determining that a disconnect option is enabled, wherein, in response to enablement of the disconnect option, the communication is disconnected in response to detection that the button has been tapped a particular number of times.

9. The method of claim 8, wherein the communication includes an audio call or a video call.

10. The method of claim 8, wherein the first fingerprint corresponds to a fingerprint of a first finger of a user, and wherein the second fingerprint corresponds to a fingerprint of a second finger of the user.

11. The method of claim 10, wherein the first group of contacts includes one of emergency contacts of the user, family contacts of the user, friend contacts of the user, or work contacts of the user, and wherein the second group of contacts is different from the first group of contacts.

12. The method of claim 8, wherein the first fingerprint corresponds to a fingerprint of a first user, and wherein the second fingerprint corresponds to a fingerprint of a second user.

13. The method of claim 8, further comprising:

detecting that the button is tapped the particular number of times; and disconnecting the communication in response to a determination that the button is tapped the particular number of times.

14. The method of claim 13, wherein the particular number of times is two times.

15. A non-transitory computer-readable medium comprising instructions that, when executed by a processor within a mobile device, cause the processor to perform operations comprising:

detecting, at a mobile device, when a button is being pressed;

generating sensor information in response to a determination that the button is pressed, the sensor information indicating at least a duration that the button is pressed;

scanning a fingerprint of a finger in response to a determination that the finger is pressing the button;

initiating a communication with a particular contact of a plurality of contacts using contact information for the particular contact, the particular contact selected based on at least the duration;

displaying a duration indicator on a display screen, the duration indicator indicating the duration;

displaying a first image associated with a first contact of the plurality of contacts on the display screen while the duration is associated with a first time span, wherein the first contact is selected if the duration is associated with the first time span;

displaying a second image associated with a second contact of the plurality of contacts on the display screen while the duration is associated with a second time span that is longer than or after the first time span, wherein the second contact is selected if the duration is associated with the second time span;

determining whether the fingerprint is associated with a first fingerprint or a second fingerprint, the first fingerprint associated with a first group of contacts of the plurality of contacts, and the second fingerprint associated with a second group of contacts of the plurality of contacts, wherein the first contact is selected from the first group of contacts in response to the fingerprint being associated with the first fingerprint or from the second group of contacts in response to the fingerprint being associated with the second fingerprint; and detecting a release of the button during the second time span, wherein initiating the communication with the particular contact comprises initiating a communication with the second contact in response to detecting the release of the button during the second time span; and determining that a disconnect option is enabled, wherein, in response to enablement of the disconnect option, the communication is disconnected in response to detection that the button has been tapped a particular number of times.

16. The non-transitory computer-readable medium of claim 15, wherein the communication includes an audio call or a video call.

17. The non-transitory computer-readable medium of claim 15, wherein the first fingerprint corresponds to a fingerprint of a first finger of a user, and wherein the second fingerprint corresponds to a fingerprint of a second finger of the user.

18. The non-transitory computer-readable medium of claim 17, wherein the first group of contacts includes one of emergency contacts of the user, family contacts of the user, friend contacts of the user, or work contacts of the user, and wherein the second group of contacts is different from the first group of contacts.

19. A mobile device comprising:
means for detecting when a button is being pressed;
means for generating sensor information in response to a determination that the button is pressed, the sensor information indicating at least a duration that the button is pressed;
means for initiating a communication with a particular contact of a plurality of contacts using contact information for the particular contact, the particular contact selected based on at least the duration;
means for displaying, the means for displaying configured to display:
a duration indicator indicating the duration;
a first image associated with a first contact of a plurality of contacts while the duration is associated with a first time span, wherein the first contact is selected if the duration is associated with the first time span; and
a second image associated with a second contact of the plurality of contacts while the duration is associated with a second time span that is longer than the first time span, wherein the second contact is selected if the duration is associated with the second time span;
means for scanning a fingerprint of a finger in response to a determination that the finger is pressing the button and for determining whether the fingerprint is associated with a first fingerprint or a second fingerprint, the first fingerprint associated with a first group of contacts of the plurality of contacts, and the second fingerprint associated with a second group of contacts of the plurality of contacts, wherein the first contact is selected from the first group of contacts in response to the fingerprint being associated with the first fingerprint or from the second group of contacts in response to the fingerprint being associated with the second fingerprint; and
means for determining that a disconnect option is enabled, wherein, in response to enablement of the disconnect option, the communication is disconnected in response to detection that the button has been tapped a particular number of times.

20. The mobile device of claim 19, wherein the communication includes an audio call or a video call.

* * * * *